United States Patent [19]
Miller et al.

[11] Patent Number: 6,143,940
[45] Date of Patent: Nov. 7, 2000

[54] METHOD FOR MAKING A HEAVY WAX COMPOSITION

[75] Inventors: Stephen J. Miller, San Francisco, Calif.; Gerald P. Huffman; Naresh Shah, both of Lexington, Ky.

[73] Assignees: Chevron U.S.A. Inc., San Francisco, Calif.; University of Kentucky Research Foundation, Lexington, Ky.

[21] Appl. No.: 09/223,227

[22] Filed: Dec. 30, 1998

[51] Int. Cl.[7] ............................ C10G 55/04; C10G 51/04
[52] U.S. Cl. ............................ 585/240; 208/69; 208/97; 585/241
[58] Field of Search ................ 208/69, 97; 585/240, 585/241

[56] References Cited

U.S. PATENT DOCUMENTS

| | | | |
|---|---|---|---|
| 3,852,207 | 12/1974 | Stangeland et al. | 208/58 |
| 3,904,513 | 9/1975 | Fischer et al. | 208/264 |
| 4,016,218 | 4/1977 | Haag et al. | 260/671 |
| 4,016,245 | 4/1977 | Plank et al. | 423/328 |
| 4,157,294 | 6/1979 | Iwao et al. | 208/264 |
| 4,481,177 | 11/1984 | Valyocsik | 423/329 |
| 4,483,835 | 11/1984 | Zones | 423/277 |
| 4,533,649 | 8/1985 | Ball et al. | 502/71 |
| 4,556,477 | 12/1985 | Dwyer | 208/111 |
| 4,642,401 | 2/1987 | Coenen et al. | 585/241 |
| 4,673,487 | 6/1987 | Miller | 208/58 |
| 4,836,910 | 6/1989 | van de Griend et al. | 208/120 |
| 4,921,594 | 5/1990 | Miller | 208/58 |
| 5,135,638 | 8/1992 | Miller | 208/27 |
| 5,158,671 | 10/1992 | Cody et al. | 208/264 |
| 5,208,005 | 5/1993 | Miller | 423/702 |
| 5,252,527 | 10/1993 | Zones | 502/64 |
| 5,354,930 | 10/1994 | Atkins et al. | 585/241 |
| 5,821,395 | 10/1998 | Price et al. | 585/241 |

FOREIGN PATENT DOCUMENTS

| | | |
|---|---|---|
| 0 065 400 B1 | 3/1986 | European Pat. Off. . |
| 0 620 264 A2 | 10/1994 | European Pat. Off. . |

OTHER PUBLICATIONS

U.S. Application Serial No. 09/224,555, Stephen J. Miller, "Method for Making a Lubricating Composition", filed Dec. 30, 1998.

U.S. Application Serial No. 09/224,554, Stephen J. Miller et al., "Method for Conversion of Waste Products to Lube Oil", filed Dec. 30, 1998.

*Primary Examiner*—Marian C. Knode
*Assistant Examiner*—Tam M. Nguyen
*Attorney, Agent, or Firm*—W. Keith Turner; Tim J. Hadlock

[57] ABSTRACT

The invention includes a process of making a wax composition including: a process for making a heavy wax composition including the steps of (1) contacting a waste plastics feed containing primarily polyethylene in a pyrolysis zone at sub-atmospheric pressure, whereby at least a portion of the waste plastics feed is cracked, thereby forming a pyrolysis zone effluent including 1-olefins and n-paraffins; and (2) passing the pyrolysis zone effluent to a hydrotreating zone, for contacting with a hydrotreating catalyst at catalytic conditions.

19 Claims, 3 Drawing Sheets

METHOD FOR MAKING A HEAVY WAX COMPOSITION

I. FIELD OF THE INVENTION

The present invention relates to a process for making a wax composition and other useful products from polymers/plastics, especially from waste polymers/plastics, particularly polyethylene.

II. BACKGROUND OF THE INVENTION

Manufacturers of mechanical equipment, food packagers and other packagers, and other users of wax for lubricating, sealing, and other uses have a continuing need for high quality wax compositions. In certain uses, a heavy wax is needed. The quality requirements increase regularly.

Manufacturing a high quality wax composition that meets more stringent requirements is typically more expensive than manufacturing a wax composition meeting less stringent requirements. This may be due to both a higher priced feed to such a process and additional or more expensive processing involved in such manufacturing.

It would be advantageous to have a relatively inexpensive process for producing heavy wax compositions. Such a process would ideally utilize a readily available inexpensive feedstock. Waste plastics/polymers have been used in known processes for the manufacture of some synthetic hydrocarbons, typically fuels or other polymers.

According to the latest report from the Office of Solid Waste, USEPA, about 62% of plastic packaging in the U.S. is made of polyethylene, the preferred feed for a plastics to waxes process. Equally important, plastics waste (after recycling) is the fastest growing waste product with about 18 million tons/yr in 1995 compared to only 4 million tons/yr in 1970. This presents a unique opportunity, not only to acquire a useful source of high quality heavy wax, but also address a growing environmental problem at the same time.

EP patent application 0620264A2 discloses a process for making a lube oil from waste plastics. The process utilizes a cracking process in a fluidized bed of inert solids and fluidized with, e.g., nitrogen. The product of the cracking is hydrotreated over an alumina catalyst or other refractory metal oxide support containing a metal component, and then optionally catalytically isomerized. EP 0620264A2 does not teach a process of producing a high yield of heavy waxes.

It would be advantageous to have a process using readily available waste plastics to produce a high yield of wax compositions, especially heavy wax compositions. The process of the present invention meets this need.

III. SUMMARY OF THE INVENTION

The invention includes a process of making a wax composition including: a process for making a heavy wax composition including the steps of (1) contacting a waste plastics feed containing primarily polyethylene in a pyrolysis zone at sub-atmospheric pressure, whereby at least a portion of the waste plastics feed is cracked, thereby forming a pyrolysis zone effluent including 1-olefins and n-paraffins; and (2) passing the pyrolysis zone effluent to a hydrotreating zone, for contacting with a hydrotreating catalyst at catalytic conditions.

IV. BRIEF DESCRIPTION OF THE DRAWINGS

V. DETAILED DESCRIPTION OF PREFERRED EMBODIMENTS

A. Process Overview

Figure 1:
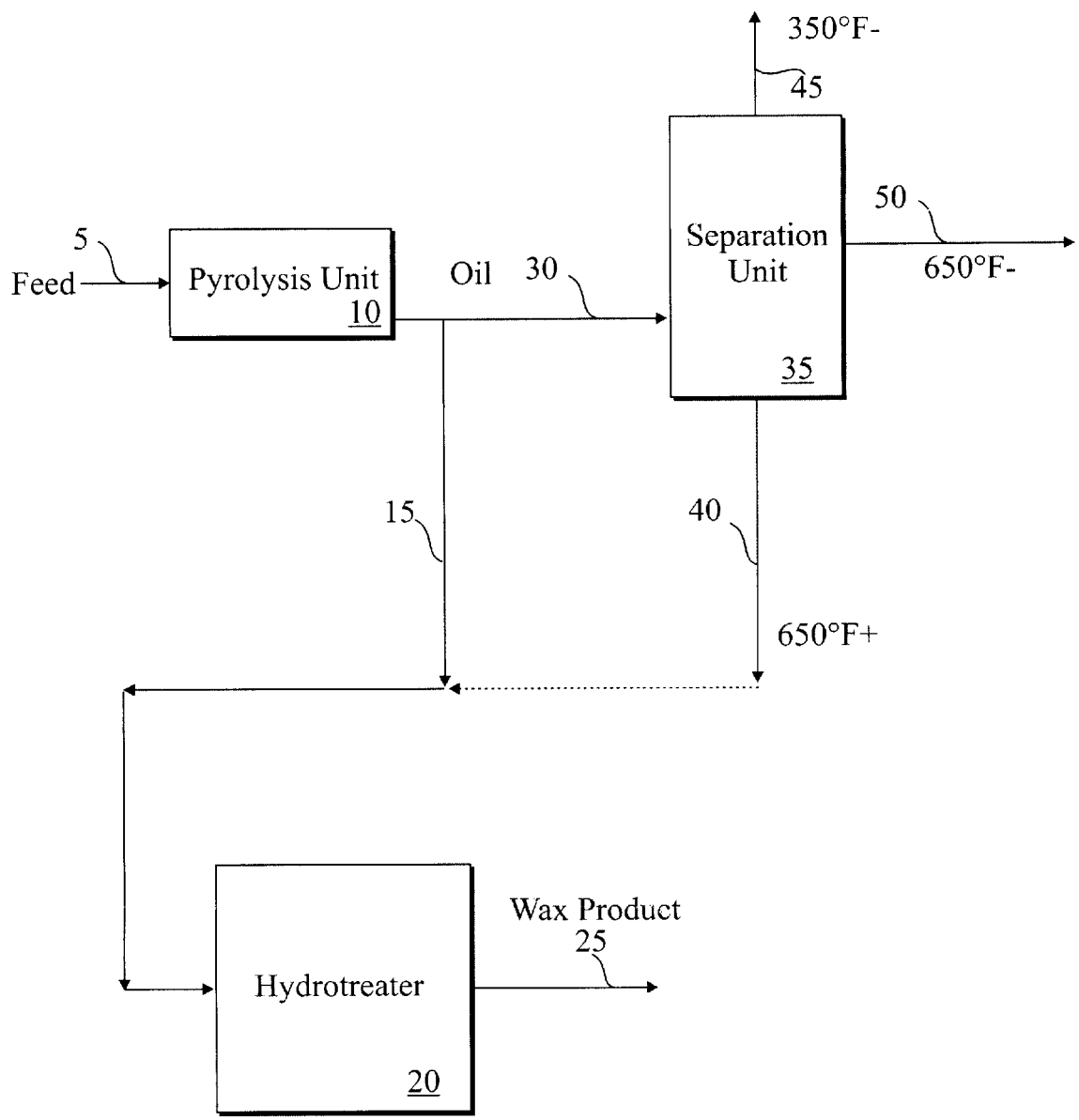
FIG. 1 is a schematic flow drawing of one embodiment of the process of the invention. Optional steps are shown in dashed lines.

FIG. 1 is a schematic flow drawing of one embodiment of the process of the invention. Waste PE feed stream 5 is fed to pyrolysis zone 10. The lube boiling range material in the pyrolysis zone effluent has a BP from about 650° F. to about 1200° F. The pyrolysis zone effluent 15 is passed to hydrotreating zone 20, thereby producing hydrotreating zone effluent stream 25. The pyrolysis zone effluent 15 is optionally first passed via stream 30 to separations zone 35. In separations zone 35 the pyrolysis zone effluent is separated into 2 or more streams as shown by 350° F. boiling point ("BP") stream 45, i.e., light fraction, 350–650° F. BP stream 50, i.e., middle fraction, and 650° F.+BP stream 40, i.e., heavy fraction. Heavy fraction stream 40 is then passed to hydrotreating zone 20. An additional separation zone (not shown) optionally follows hydrotreating zone 20 for fractionating the wax into fractions of various properties.

B. Pyrolysis

The first step in the process for making a high quality wax composition according to the invention is contacting a waste plastics feed containing polyethylene in a pyrolysis zone at pyrolysis conditions, where at least a portion of the waste plastics feed is cracked, thus forming a pyrolysis zone effluent comprising 1-olefins and n-paraffins. The percentage of 1-olefins in the pyrolysis zone effluent is optionally from about 25 to 75 wt. %, preferably from about 40–60 wt. %. Pyrolysis conditions include a temperature of from about 500–700° C., preferably from about 600–700° C.

Conventional pyrolysis technology teaches operating conditions of above-atmospheric pressures. See, e.g., U.S. Pat. No. 4,642,401. It has been discovered that by adjusting the pressure downward, the yield of a desired product can be controlled. For a lighter wax composition, the pyrolysis zone pressure is about atmospheric, preferably from about 0.75 atm to about 1 atm. For a heavier wax composition, the pyrolysis zone pressure is preferably sub-atmospheric, preferably not greater than about 0.75 atmospheres or 0.5 atmospheres. It has been discovered that sub-atmospheric pressures in the pyrolysis zone results in a greater yield of heavier wax composition, since the thermally cracked waste plastic goes overhead and out of the pyrolysis zone before secondary cracking can occur.

The pyrolysis zone pressure is optionally controlled by vacuum or by addition of an inert gas (i.e., acts inert in the pyrolysis zone), e.g., selected from the group comprising nitrogen, hydrogen, steam, methane or recycled light ends from the pyrolysis zone. The inert gas reduces the partial pressure of the waste plastic gaseous product. It is this partial pressure which is of interest in controlling the weight of the pyrolysis zone product.

The pyrolysis zone effluent (liquid portion) includes n-paraffins and some olefins. It may also contain undesirable S, N, and aromatics. Further processing according to the invention is typically needed to convert it to a high quality wax composition.

The feed may contain some contaminants normally associated with waste plastics, e.g., paper labels and metal caps.

Typically, from about 80 wt. % to about 100 wt. % of the waste plastics feed consists essentially of polyethylene, preferably about 95 wt. % to about 100 wt. %. Typically, the feed is prepared by grinding to a suitable size for transport to the pyrolysis unit using any conventional means for feeding solids to a vessel. Optionally, the ground waste plastics feed is also heated and initially dissolved in a solvent. The heated material is then passed by an auger, or other conventional means, to the pyrolysis unit. After the initial feed, a portion of the heated liquefied feed from the pyrolysis zone is op tionally removed and recycled to the feed to provide a heat source for dissolving the feed.

The feed may contain chlorine, preferably less than about 20 ppm. Preferably, a substantial portion of any chlorine in the feed is removed by the addition to the feed of a chlorine scavenger compound, e.g., sodium carbonate. It reacts in the pyrolysis zone with the chlorine to form sodium chloride which becomes part of the residue at the bottom of the pyrolysis zone. Preferably, the chlorine content is removed to less that about 5 ppm.

C. Hydrotreating

The pyrolysis effluent is preferably hydrotreated to remove compounds, e.g., N, S or O containing compounds, that could produce an unstable wax composition, e.g., color instability. Hydrotreating is typically conducted by contacting the pyrolysis zone effluent with a hydrotreating catalyst at hydrotreating conditions. A conventional catalytic hydrotreating process may be used.

The hydrotreating is done under conditions to remove substantially all heteroatoms, while minimizing cracking. Typically, hydrotreating conditions include temperatures ranging from about 190° C. to about 340° C., pressures of f rom about 400 psig to about 3000 psig, space velocities (LHSV) of from about 0.1 to about 20, and hydrogen recycle rates of from about 400 to about 15000 SCF/bbl.

Suitable hydrogenation catalysts include conventional, metallic hydrogenation catalysts, particularly the Group VIII metals such as Co, Mo, Ni, and W. The metals are typically associated with carriers such as bauxite, alumina, silica gel, silica-alumina composites, and crystalline aluminosilicate zeolites and other molecular sieves. If desired, non-noble Group VIII metals can be used with molybdates or tungstates. Metal oxides, e.g., nickel/cobalt promoters, or sulfides can be used. Suitable catalysts are disclosed in U.S. Pat. Nos. 3,852,207; 4,157,294; 4,921,594; 3,904,513 and 4,673,487, the disclosures of which are incorporated herein by reference. The S and N levels of the hydrotreated pyrolysis effluent heavy fraction portion are preferably not greater that about 5 ppm S and 1 ppm N.

The hydrotreated pyrolysis zone effluent contains a wax having a melting point of at least about 100° C. Preferably, at least about 10 wt. % of the hydrotreated pyrolysis zone effluent includes a wax having a boiling point of at least about 1000° F. More preferably, at least about 50 wt. % of the hydrotreated pyrolysis zone effluent includes a wax having a boiling point of at least about 1000° F.

D. Separations Step

The pyrolysis zone effluent typically contains a broad boiling point range of materials. Optionally, prior to passing the pyrolysis zone effluent to the hydrotreating zone, the pyrolysis zone effluent is passed to a conventional separations zone, e.g., distillation column; where it is separated in typically at least three fractions, a light, middle, and heavy fraction. The light fraction contains, e.g., 350° F.–BP, gasoline range material, and gases. The middle fraction is typically a middle distillate range material, e.g., diesel fuels range, e.g., 350–650° F. BP. The heavy fraction is lube oil range material, e.g., 650° F.+BP. All fractions contain n-paraffins and 1 -olefins. All or a portion of the heavy fraction and/or the middle fraction are then sent to the hydrotreating zone as described above.

VI. ILLUSTRATIVE EMBODIMENTS

The invention will be further clarified by the following Illustrative Embodiments, which are intended to be purely exemplary of the invention. The results are shown in Tables 1–8 below.

EXAMPLE 1

High density polyethylene (HDPE) was pyrolyzed in a pyrolysis reactor at atmospheric pressure and different temperatures, as shown in Table 1, which also gives yields of gas, residue, and waxy oil, as well as boiling point distributions of the waxy oil. This table shows that most of the oil in the lube boiling range was in the range of 650–1000° F., with little boiling in the bright stock range above 1000° F.

The waxy oil fraction of the material pyrolyzed at 650° C. was evaluated by high pressure liquid chromatography followed by GC-MS. It was found to be composed almost entirely of n-paraffins and 1-olefins, as shown in Table 2.

EXAMPLE 2

Figure 2:
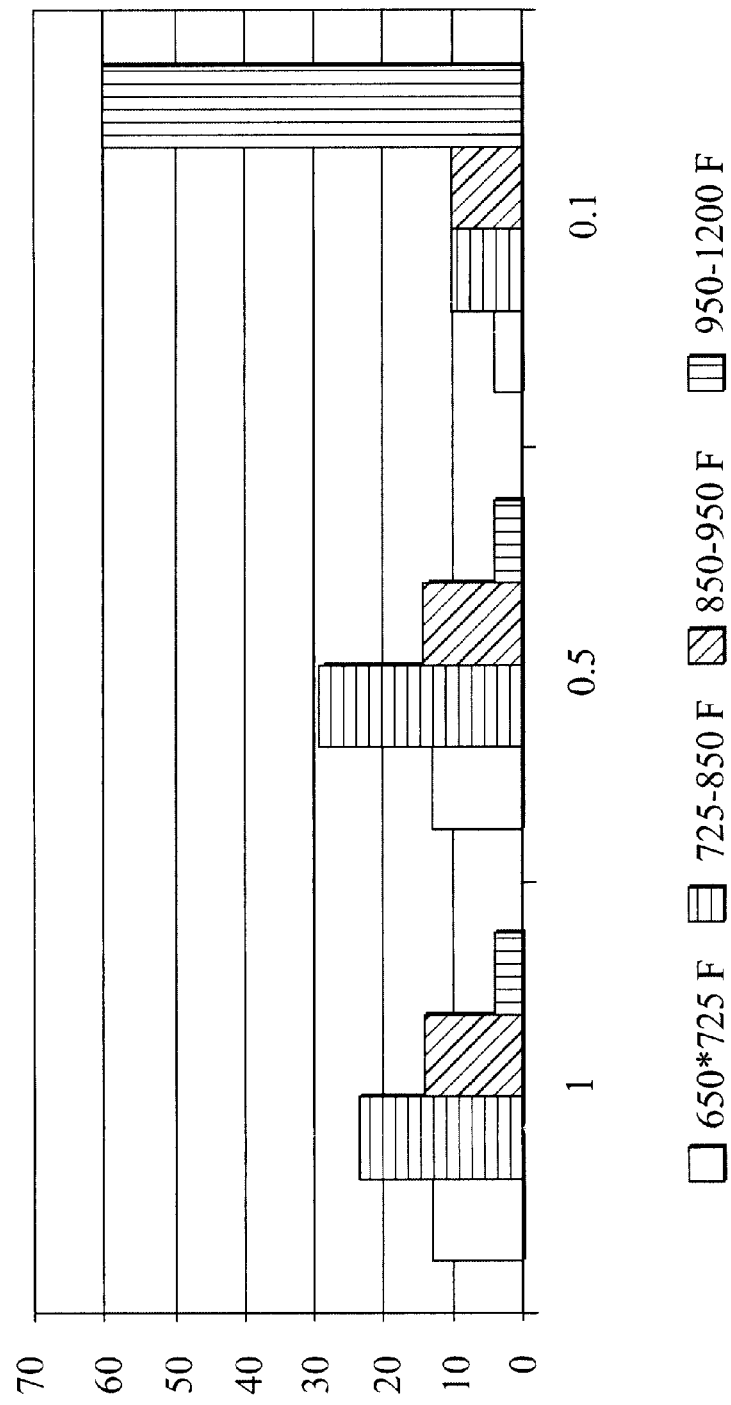
FIG. 2 is a bar graph depicting the effect of pressure in the pyrolysis zone from experimental results discussed in the "Illustrative Embodiments" section of this specification.

HDPE was pyrolyzed in the pyrolysis reactor, as in Example 1, except at sub-atmospheric pressure, as indicated in Table 3 and FIG. 2. This shows not only an increase in the yield of lube range waxy oil (650° F.+), but also a large increase in bright stock range waxy oil (950–1200° F.).

EXAMPLE 3

Waste HDPE, obtained from a recycling center, was pyrolyzed at 650° C. and 0.5 atm pressure. Table 4 shows the results are very similar to those obtained with the virgin HDPE of Examples 1 and 2.

EXAMPLE 4

Figure 3:
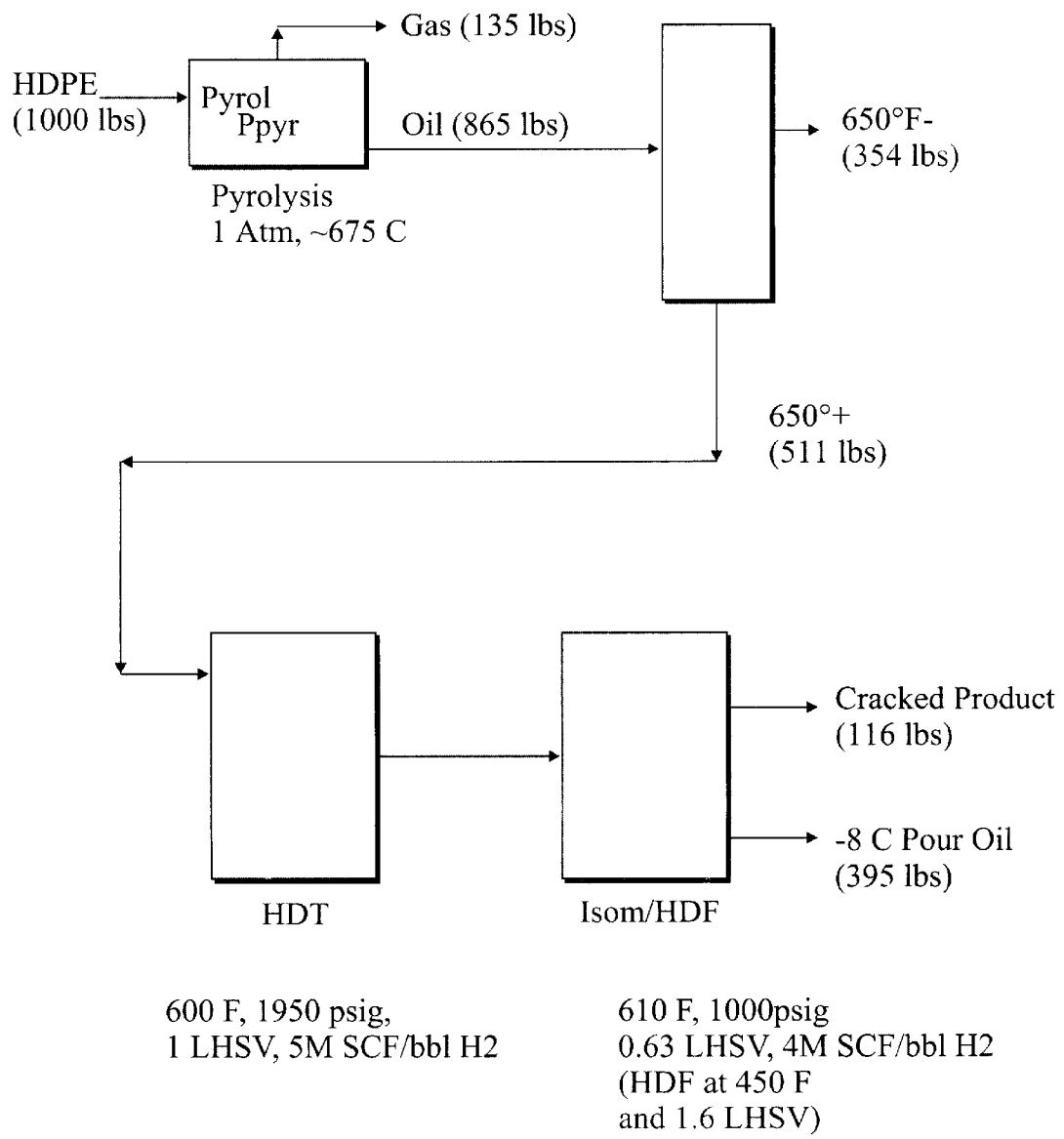
FIG. 3 is a schematic flow drawing includes in a larger process, one embodiment of the process of the invention and depicts experimental results discussed in the "Illustrative Embodiments" section of this specification.

The waxy oil produced in Example 1 at atmospheric pressure and 650, 675, and 700° C. was composited. The waxy oil yield of the composite was 86.5 wt %. This oil was distilled at 650° F. to give 59.1 wt % 650° F.+ bottoms (51.1 wt % based on HDPE feed). The 650° F.+ bottoms were then hydrotreated over a Ni—Mo hydrotreating catalyst at 600° F., 1950 psig, 1 LHSV, and 5 MSCF/bbl once-through H2 to reduce the nitrogen level to below 1 ppm. Conversion of 650° F.+ material in the feed to 650° F.− was less than 1%. The hydrotreated oil was then processed at 1000 psig and 4 MSCF/bbl once-through H2 over an isomerization dewaxing catalyst at 610° F. and 0.63 LHSV followed by a hydrofinishing catalyst at 450° F. and 1.6 LHSV. The isomerization catalyst was Pt on SAPO-11 (made according to U.S. Pat. No. 5,135,638) and the hydrofinishing catalyst was Pt/Pd on SiO2—Al2O3. This gave a 4 cSt oil (viscosity measured at 100° C.) with a pour point of −8° C. and a viscosity index of 153, as shown in Table 5. The 650° F.+ yield through the isomerization step was 67 wt %. A flow diagram of the process, based on 1000 pounds of HDPE, is given in FIG. 3.

EXAMPLE 5

HDPE was pyrolyzed in the pyrolysis reactor at subatmospheric pressure, as shown in Table 6 to again give a large amount of both lube and bright stock range waxy oil.

EXAMPLE 6

The waxy oil produced in Example 2 at 0.10 atm pressure and 600, 650, and 700° C. was composited (distillation analysis shown in Table 7) and hydrotreated over a Ni—Mo hydrotreating catalyst at 600° F., 1950 psig, 1 LHSV, and 5

MSCF/bbl once-through H2 to reduce the nitrogen level to below 1 ppm. Conversion of 650° F.+ material in the feed to 650° F.− was less than 1%. The waxy oil was then isomerized as in Example 4, but at an isomerization temperature of 685° F., to give a 9 cSt oil with a pour point of 0° C. and a 137 VI, as shown in Table 8.

EXAMPLE 7

The waxy oil produced in Example 2 at 0.5 atm pressure and 550, 600 and 650° C. was composited (distillation analysis shown in Table 7) and hydrotreated over a Ni—Mo hydrotreating catalyst at 600° F., 1950 psig, 1 LHSV, and 5 MSCF/bbl once-through H2 to reduce the nitrogen level to below 1 ppm. Conversion of 650° F.+ material in the feed to 650° F.− was less than 1%. The waxy oil was then isomerized as in Example 4, but at an isomerization temperature of 648° F., to give a 3.7 cSt oil with a pour point of −22° C. and a 153 VI, as shown in Table 8.

TABLE 4

COMPARISON OF WASTE HDPE VERSUS PLANT HDPE FOR PYROLYSIS AT 650° C. AND 0.5 ATM

| Feed | HDPE | Waste HDPE |
|---|---|---|
| Oil Yield, Wt % | 90.1 | 86.7 |
| Residue, Wt % | 0 | 0.9 |
| Gas Yield, Wt % | 6.3 | 11.7 |
| Oil Inspections | | |
| ST/5 | 182/385 | 186/368 |
| 10/30 | 457/626 | 442/619 |
| 50 | 730 | 723 |
| 70/90 | 807/889 | 810/900 |
| 95/99 | 922/1224 | 939/1224 |

TABLE 1

HPDE PYROLYSIS RESULTS AT 1 ATM

| Pyrolysis Temp, ° F. | 550 | 575 | 600 | 625 | 650 | 675 | 700 |
|---|---|---|---|---|---|---|---|
| Oil Yield, Wt % | 85.2 | 88.8 | 88.8 | 87.4 | 87.0 | 86.0 | 86.5 |
| 650° F. + Yield, Wt % | 35.8 | 39.1 | 41.6 | 47.1 | 53.5 | 52.1 | 53.6 |
| 700° F. + Yield, Wt % | 29.2 | 32.3 | 34.7 | 41.0 | 44.8 | 44.9 | 46.4 |
| Oil Inspections | | | | | | | |
| Sim. Dist, LV %, ° F. | | | | | | | |
| ST/5 | 80/201 | 75/253 | 80/201 | 87/208 | 186/338 | 188/328 | 188/328 |
| 10/30 | 253/443 | 253/449 | 256/458 | 280/487 | 403/588 | 390/588 | 394/596 |
| 50 | 580 | 598 | 620 | 660 | 711 | 715 | 722 |
| 70/90 | 714/872 | 729/877 | 743/898 | 796/952 | 803/892 | 808/902 | 818/908 |
| 95/EP | 934/1027 | 938/1021 | 954/1032 | 1003/1089 | 928/1224 | 931/1224 | 940/1224 |

TABLE 2

ANALYSIS OF WAXY OIL PYROLYZED AT 1 ATM AND 650° C.

| | Wt % |
|---|---|
| N-Paraffins | ~50 |
| 1-Olefins | ~49 |
| Aromatics | 0.7 |
| Polars | 0.4 |

TABLE 5

INSPECTIONS IN CONERVERSION OF HDPE TO LUBE OIL

| Identification | HDPE Feed | Pyrolyzed PE 650–700° C. Comp. | HDT'd 650° F.+ Feed | Isomerized Oil |
|---|---|---|---|---|
| Gravity, API | | | 40.0 | 40.0 |
| Nitrogen, ppm | 53 | 29 | 0.2 | |
| Oxygen, ppm | 147 | 297 | | |

TABLE 3

HDPE PYROLYSIS RESULTS AT REDUCED PRESSURE

| Pyrolysis Pressure, Atm | 0.5 | 0.5 | 0.5 | 0.1 | 0.1 | 0.1 |
|---|---|---|---|---|---|---|
| Pyrolysis Temp, ° C. | 600 | 650 | 700 | 550 | 600 | 650 |
| Oil Yield, Wt % | 88.8 | 90.1 | 89.7 | 83.5 | 88.0 | 89.1 |
| Residue, Wt % | 1.8 | 0 | 0 | 3.0 | 0 | 0 |
| Gas Yield, Wt % | 5.9 | 6.3 | 6.7 | 6.5 | 7.3 | 10.6 |
| 650° F.+ Yield, Wt % | 45.6 | 58.8 | 63.9 | 50.9 | 74.4 | 82.7 |
| 700° F.+ Yield, Wt % | 38.7 | 50.2 | 56.2 | 41.4 | 70.0 | 80.4 |
| Oil Inspections | | | | | | |
| Sim. Dist., Wt %, ° F. | | | | | | |
| ST/5 | 308/317 | 182/385 | 181/402 | 183/366 | 194/478 | 184/605 |
| 10/30 | 342/521 | 457/626 | 486/658 | 442/604 | 573/792 | 704/925 |
| 50 | 658 | 730 | 760 | 702 | 948 | 1052 |
| 70/90 | 777/928 | 807/889 | 837/910 | 777/864 | 1068/1098 | 1085/1103 |
| 95/99 | 992/1181 | 922/1224 | 941/1071 | 897/997 | 1106/1224 | 1107/1149 |

TABLE 5-continued

INSPECTIONS IN CONERVERSION OF HDPE TO LUBE OIL

| Identification | HDPE Feed | Pyrolyzed PE 650–700° C. Comp. | HDT'd 650° F.+ Feed | Isomerized Oil |
|---|---|---|---|---|
| Pour Pt, ° C. | | | | −8 |
| Cloud Pt, ° C. | | | | +12 |
| Viscosity, | | | | |
| 40° C. cSt | | | | 17.07 |
| 100 C, cSt | | | | 4.155 |
| VI | | | | 153 |
| Sim. Dist., | | | | |
| TGA, LV %, | | | | |
| ° F. | | | | |
| ST/5 | | 186/341 | 193/701 | 362/559 |
| 10/30 | | 422/625 | 759/850 | 621/711 |
| 50 | | 752 | 906 | 781 |
| 70/90 | | 847/935 | 950/997 | 860/959 |
| 95/EP | | 961/ | 1014/ | 993/1034 |

TABLE 6

HPDE PYROLYSIS RESULTS AT REDUCED PRESSURE

| Pyrolysis Temperature, ° C. | 650 | 650 | 650 | 650 | 700 | 700 |
|---|---|---|---|---|---|---|
| Pyrolysis Pressure, Atm | 0.5 | 0.25 | 0.25 | 0.1 | 0.5 | 0.25 |
| +0.5% Na2CO3 | No | No | Yes | No | No | No |
| Gas, Wt % | 9.63 | 8.92 | 7.23 | 8.04 | 4.9 | 6.3 |
| Naphtha, Wt % | 14.39 | 5.00 | 5.71 | 6.18 | 20.9 | 11.38 |
| Oil, Wt % | 75.98 | 86.08 | 86.70 | 85.78 | 68.04 | 82.32 |
| Residue, Wt % | 0 | 0 | 0.25 | 0 | 0.28 | 0 |
| 650 F. + Yield, Wt % | 68.9 | 78.7 | 79.0 | 82.8 | 64.4 | 82.20 |
| 1000 F. + Yield, Wt % | 26.8 | 43.4 | 44.9 | 57.4 | 5.7 | 71.39 |
| Inspections | | | | | | |
| Naphtha | | | | | | |
| Sim. Dist, LV %, ° F. | | | | | | |
| ST/5 | 64/147 | 82/148 | 139/177 | 75/148 | 81/150 | 92/157 |
| 10/30 | 155/252 | 171/251 | 206/261 | 178/262 | 174/266 | 203/293 |
| 50 | 340 | 336 | 339 | 376 | 375 | 379 |
| 70/90 | 432/605 | 420/621 | 414/546 | 482/650 | 479/628 | 472/627 |
| 95/EP | 693/893 | 727/941 | 651/944 | 730/894 | 713/913 | 710/893 |
| Oil | | | | | | |
| Sim. Dist., Wt %, ° F. | | | | | | |
| ST/5 | 189/554 | 186/569 | 183/573 | 187/674 | 192/597 | 188/831 |
| 10/30 | 640/812 | 670/876 | 665/870 | 784/978 | 671/810 | 949/1077 |
| 50 | 921 | 1003 | 1016 | 1077 | 885 | 1093 |
| 70/90 | 1037/1094 | 1083/1105 | 1085/1106 | 1098/1111 | 941/995 | 1104/1115 |
| 95/EP | 1103/ | 1109/ | 1112/ | 1117/ | 1018/ | 1119/ |
| Chloride, ppm | | <10 | <10 | | | |

TABLE 7

PYROLYZED/HDT'D FEEDS

| Identification Composite | 0.5 Atm Composite | 0.1 Atm |
|---|---|---|
| | (600,650,700° C.) | (550,600,650° C.) |
| Sim. Dist., Wt %, ° F. | | |
| ST/5 | 197/523 | 186/542 |
| 10/30 | 585/700 | 605/737 |
| 50 | 778 | 833 |
| 70/90 | 837/903 | 928/1054 |
| 95/ | 932/ | 1078/ |

TABLE 8

ISOMERIZATION OF HDT'D PYROLYZED HDPE AT 0.62 LHSV, 1950 PSIG, AND 4 MSCF/BBL OVER Pt/SAPO-11

| Feed | 0.5 Atm Composite | 0.1 Atm Composite |
|---|---|---|
| Temperature, ° F. | 648 | 685 |
| Pour Point, ° C. | −22 | 0 |
| Cloud Point, ° C. | +22 | +59 |
| Viscosity, 40° C., cSt | 14.15 | 57.24 |
| 100° C., cSt | 3.672 | 9.034 |
| VI | 153 | 137 |
| Sim. Dist., Wt %, ° F. | | |
| ST/5 | 460/562 | 504/586 |
| 10/30 | 602/693 | 622/720 |
| 50 | 770 | 822 |
| 70/90 | 855/966 | 980/1308 |
| 95/EP | 1004/1088 | 1353/1400 |

What is claimed is:

1. A process for making a heavy wax composition comprising the steps of:
   (a) passing a waste plastics feed comprising polyethylene to a pyrolysis zone, having a sub-atmospheric pressure, whereby at least a portion of said waste plastics feed is cracked, thereby forming a pyrolysis zone effluent comprising 1-olefins and n-paraffins;
   (b) passing at least a portion of said pyrolysis zone effluent to a catalytic hydrotreating zone wherein at least a portion of said pyrolysis zone effluent is contacted with a hydrotreating catalyst at hydrotreating conditions, thereby producing a hydrotreated pyrolysis zone effluent; and (c) wherein said hydrotreated pyrolysis zone effluent comprises a wax having a melting point of at least about 100° C.

2. The process of claim 1, wherein at least about 10 wt. % of said hydrotreated pyrolysis zone effluent comprises a wax having a boiling point of at least about 1000° F.

3. The process of claim 1, wherein a major portion of said wax boils in the bright stock range.

4. The process of claim 1, wherein said pyrolysis zone is at sub-atmospheric pressure not greater than about 0.75 atmospheres.

5. The process of claim 1, wherein said pyrolysis zone is at sub-atmospheric pressure not greater than about 0.50 atmospheres.

6. The process of claim 1, further comprising:
   (a) passing said pyrolysis zone effluent of step (a), to a separation zone, thereby separating said pyrolysis zone effluent into at least one heavy fraction and one middle fraction, said middle fraction comprising 1-olefins; and
   (b) passing at least a portion of said pyrolysis effluent heavy fraction to said catalytic hydrotreating zone.

7. The process of claim 1, wherein pyrolysis zone includes an inert gas selected from the group consisting of nitrogen, hydrogen, steam, methane or a recycled light fraction from said separations zone in step (b).

8. The process of claim 1, wherein said waste plastics feed comprises at least about 95 wt. % polyethylene.

9. The process of claim 1, wherein from about 25 wt. % to about 75 wt. % of said pyrolysis zone effluent comprises 1-olefins.

10. The process of claim 1, wherein said waste plastics feed comprises non-plastic material comprising paper or metal.

11. The process of claim 6, wherein the yield of said wax based on the weight of said pyrolysis effluent heavy fraction is at least about 50 wt. %.

12. The process of claim 6, wherein the yield of said wax based on the weight of said pyrolysis effluent heavy fraction is at least about 60 wt. %.

13. The process of claim 6, wherein the yield of said wax based on the weight of said pyrolysis effluent heavy fraction is at least about 70 wt. %.

14. The process of claim 1, wherein said pyrolysis zone is a temperature of from about 500° C. to about 700° C.

15. The process of claim 1, wherein said pyrolysis zone is a temperature of from about 600° C. to about 700° C.

16. The process of claim 1, wherein prior to passing said waste plastic feed to said pyrolysis zone, said waste plastic feed is ground and substantially liquefied.

17. The process of claim 1, wherein the S and N levels of said hydrotreated pyrolysis zone effluent are not greater than about 5 ppm S and 1 ppm N.

18. A process for making a heavy wax composition comprising the steps of:
   (a) passing a waste plastics feed comprising polyethylene to a pyrolysis zone having a temperature of from about 600° C. to about 700° C. and pressure not greater than about 0.75 atm., whereby at least a portion of said waste plastics feed is cracked, thereby forming a pyrolysis zone effluent comprising 1-olefins and n-paraffins;
   (b) passing said pyrolysis zone effluent, to a separation zone, thereby separating said pyrolysis zone effluent into at least a one heavy fraction and one middle fraction, said middle fraction comprising normal alpha olefins, to a separation zone; wherein said pyrolysis effluent heavy fraction portion is separated from said pyrolysis effluent middle fraction;
   (c) passing pt least a portion of said pyrolysis effluent heavy fraction to a catalytic hydrotreating zone wherein at least a portion of said pyrolysis effluent heavy fraction is contacted with a hydrotreating catalyst at hydrotreating conditions, thereby producing a hydrotreated pyrolysis effluent heavy fraction; and
   (d) wherein said hydrotreated pyrolysis effluent heavy fraction comprises a wax having a melting point of at least about 100° C.

19. The process of claim 18, wherein at least about 10 wt. % of said hydrotreated pyrolysis effluent heavy fraction comprises a wax having a boiling point of at least about 1000° F.

* * * * *